Jan. 25, 1927.

F. A. BENFORD 1,615,735

MIRROR

Filed July 24, 1923

2 Sheets-Sheet 1

Inventor:
Frank A. Benford,
by *Alexander D. Lunt*
His Attorney.

Jan. 25, 1927. 1,615,735

F. A. BENFORD

MIRROR

Filed July 24, 1923 2 Sheets-Sheet 2

Inventor:
Frank A. Benford,
by *Alexander S. Lint*
His Attorney.

Patented Jan. 25, 1927.

1,615,735

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

MIRROR.

Application filed July 24, 1923. Serial No. 653,524.

My invention relates to mirrors of the type which have a front or first surface of ellipsoidal type and which are especially adapted for use in connection with motion picture apparatus.

The condensing lenses now on the market fall short of realizing the maximum possible photometric efficiency. There are a number of reasons for this. First, a compound condensing lens can collect only 25 per cent of the light from the lamp. Second, the ideal condenser should have a "speed" somewhat in excess of the "speed" of the projection lens, for example, a 5.00" focus, f2.1 lens should be a condensing system about 5 inches in diameter at the second member when the latter is 7" from the aperture. All this means large thick lenses which must be of optical glass and therefore costly. Third, these lenses are difficult to make and anneal, so that they will withstand the heat of the high current arc. Fourth, the glass that is proof against such heat is usually amber colored, which is undesirable. Fifth, the high intensity arc throws off sparks and pits the surface of the lens. Sixth, the high intensity arc is liable to smoke up the condensers upon starting. All of the above difficulties can be overcome to a great extent if not altogether by using a mirror in place of the lenses. The initial cost of the mirror is much greater, but this is more than compensated for by the lower maintenance and greater durability of a properly designed and mounted mirror. A type of mirror base adapted for the purpose is of the ellipsoidal type. There is one objection to such mirrors, namely, that the first surface and the second surface ordinarily reflect each an independent beam, which beams do not have a common focal point. It is an object of my invention to produce a mirror which is free from this objection. In the mirror of my design, the first surface is made as strictly ellipsoidal as possible and the second surface is especially constructed so that the second focal point of the first surface is common to the two surfaces.

Figure 1:
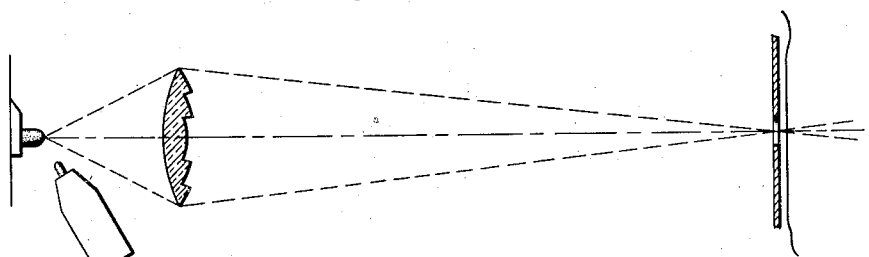
Figure 6:
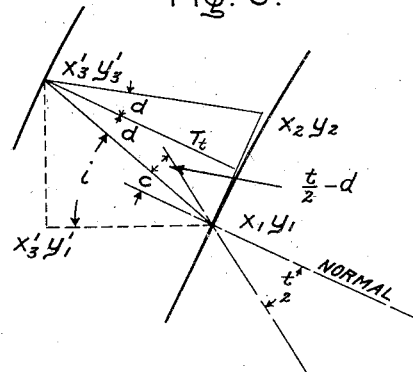
Figure 2:
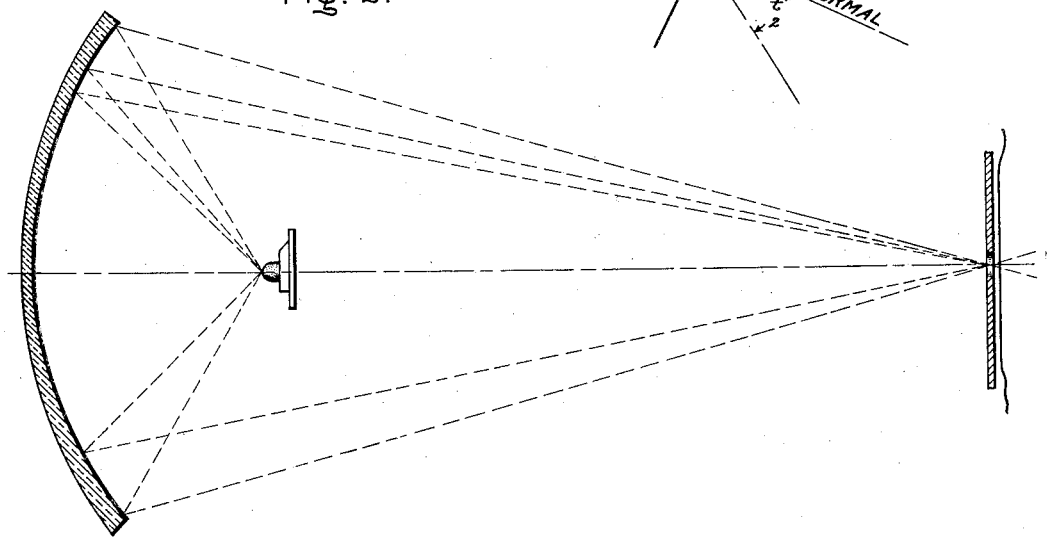
Figure 3:
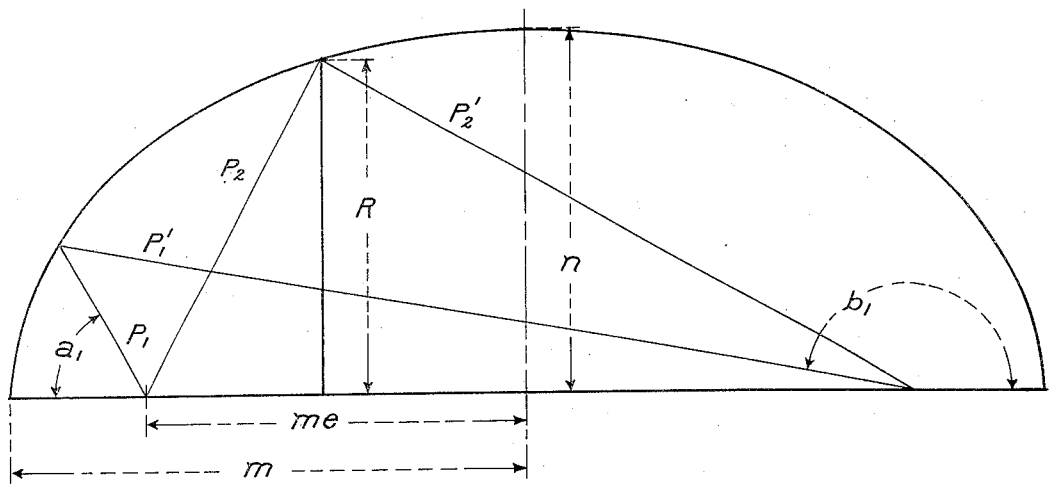
Figure 4:
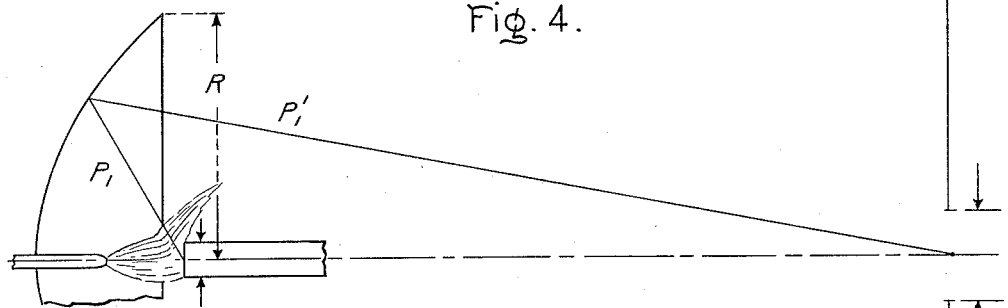
Figure 5:
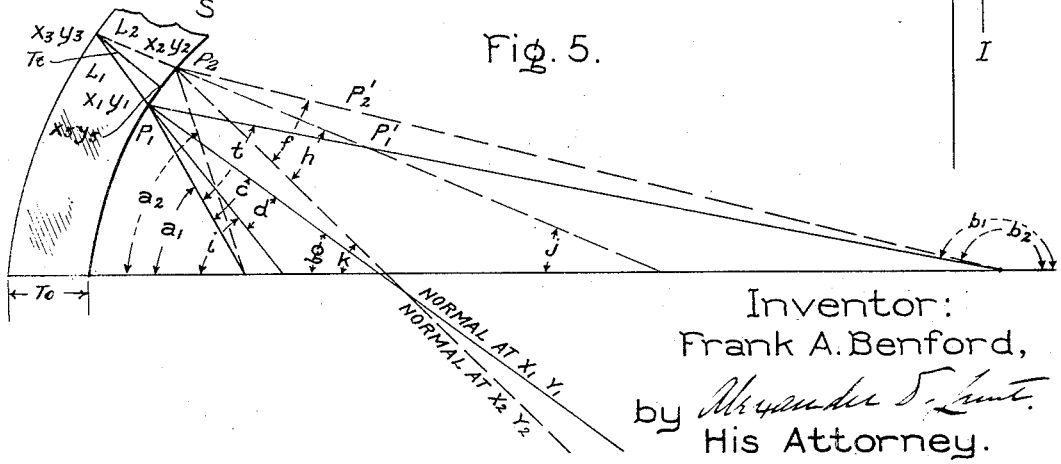

The construction of such a mirror involves, first, the selection of a first surface of the proper character inasmuch as the first surface of a two-surface glass reflects about 5 per cent of the total reflected light. For this reason, the first surface must have the correct curvature and the first step involves the selection of such an ellipsoidal as will properly direct the 5 per cent ray mentioned. In this consideration, I will refer to the accompanying drawings, in which Fig. 1 illustrates the optical system of a motion picture device of the prior art in which condensing lenses are used. This figure also illustrates the objectionable features above pointed out; Fig. 2 illustrates the use of a mirror of my construction in a motion picture system, the mirror being shown cut by a plane through the major axis; Fig. 3 shows the principal section of the first or ellipsoidal surface; Fig. 4 shows the relation of the mirror to the arc and to the aperture; Fig. 5 illustrates one construction for determining the thickness of the mirror; Fig. 6 illustrates a second construction for the same purpose.

Theory of first surface.

Referring to the drawings and in particular to Figs. 3 and 4 for the present, in selecting the first surface, it must be borne in mind that certain physical relations must be preserved and these are illustrated as follows:

a. Given the diameter of the light source S, and the desired average diameter of the image I at the aperture we have the enlarging ratio $$f = \frac{I}{S} \quad (1)$$

b. The enlarging ratio is also represented by the ratio of the radius vectors from the two conjugate focii to any given point of reflection. Thus, for Figs. 3 or 4

$$f = \frac{P'_1}{P_1} \quad (2)$$

c. The lengths of the radius vectors are $$P_1 = \frac{m(1-e^2)}{1+e \cos a_1} \quad (3)$$

and $$P'_1 = \frac{m(1-e^2)}{1+e \cos b_1} \quad (4)$$

where $e$ is the ellipticity of the ellipse as defined by $$e = \frac{\sqrt{m^2 - n^2}}{m} \quad (5)$$

$m$ being the semi-major axis and $n$ being the semi-minor axis, and the angles $a_1$ and $b_1$ being measured as shown in Fig. 3.

*d.* For the light on the axis, assuming no interference by the electrodes, we have the simple forms $$f \frac{1+e}{1-e} \quad (6)$$

and therefore $$e = \frac{f-1}{f+1} \quad (7)$$

*e.* The diameter of the mirror may be computed from some selected value of $b_1$ to suit the speed of the projection lens.

$$R = P'_2 \sin b$$
$$= \frac{m(1-e^2) \sin b_2}{1+e \cos b_2} \quad (8)$$

where R is the radius (as indicated in Fig. 3) of the edge of the mirror.

*Theory of second surface.*

The light reflected from the second surface of a glass mirror is influenced by the curvature and position of the first surface. Upon entering the glass the light is refracted toward the normal, and upon leaving the glass after reflection at the second surface, the light is refracted away from the normal. These two refractions are not equal and as a result the back surface should not be parallel to the front surface. It is a fact that two ellipses, one within the other and having coincident axes, are not parallel except at the points where the curves cross the axes, but this outer non-parallel curve will not in this case satisfy the optical condition. In other words, the outer non-parallel surface of an optically accurate ellipsoidal mirror is not an ellipsoid.

The ellipsoid may be described as a surface of revolution every point of which is related to the two focii in such a way that the sum of the distance to the two focii is a constant and equal to the major axis. This same description applies to the second surface, except that when the light passes through the glass the optical length of the path must be increased by a factor equal to the refractive index of the glass. Thus, one inch through glass having an index of 1.52 is the equivalent of 1.52 inches of air. The optical conditions are satisfied when the actual path length is thus corrected and is equal for all parts of the mirror.

It will be demonstrated later that the vertex or center of the mirror, the point at the end of the major axis, is the thinnest part of the glass and the circumference around the plane of the minor axis (if the mirror extends that far) is the thickest part. There are here two limiting mechanical dimensions that for reasons of strength, weight, cost, or resistance to heat may be of the greatest importance. Suppose that for any or all of the above factors we decide upon a certain central (minimum) thickness of glass. Call this thickness $T_0$. Tracing a ray from the object focus (at the left of Fig. 5) along the axis to the second surface and then back to the image focus at the right, we follow straight line paths, and we can write immediately the optical length of path $$L_0 = m(1-e) + 2\mu T_0 + m(1+e)$$
$$= 2\mu T_0 + 2m \quad (9)$$

At any angle $a$ we therefore have $$\mu(L_1+L_2) + P_1 + P'_2 = 2\mu T_0 + 2m \quad (10)$$

where $L_1$ is the actual length of the ray path from first surface to second surface at point of reflection.

$L_2$ is the actual length of the ray path from second surface to first surface at point of exit.

$P_1$ is the length of path from the source to the point of entrance.

$P'_2$ is the length of path from the point of exit to the image.

It should be noted that as the entrance and exit points do not coincide the sum of $P_1$ and $P'_2$ is not equal to $2m$, and moreover it varies with the angle $a$.

$$P_1 + P'_2 \text{ is not equal to } 2m \quad (11)$$
$$P_1 + P'_2 = f(a) \quad (12)$$

On account of these relations $P_1$ and $P'_2$ must be computed for each point $(x_3 y_3)$ on the back of the mirror.

*Exact method of computing the second surface.*

The exact method of determining the form of the second surface is a trial method by which the location of points on the second surface is arrived at by successive trials, and the accuracy of determination depends only upon the accuracy with which the computations are carried out, and by the number of times the computer is willing to repeat the process in order to gain accuracy.

Starting at the focal point at which the light is located, a line is drawn at any desired angle and the length to the first surface at $(x_1 y_1)$ is completed. Call this length $P_1$. The ray is then traced into the glass and extended indefinitely. Some point $(x_2 y_2)$ on the first surface is selected in the region where it is estimated the ray will emerge, and the length of $P'_2$ is completed. The ray is then traced backward from $(x_2 y_2)$ into the glass and the point of intersection with the previous path is solved for. The four parts of the trial path are now known and these values are substituted in equation (10) for the first trial solution. A number of $(x_2 y_2)$ points are tried until one is found that satisfies equation (10) with satisfactory exactness.

*Arrangement of work for exact determination of second surface of ellipsoid.*

Step 1. Assume some value for angle $a_1$ and solve for $P_1$ (see Figs 3 and 5)

$$P_1 = \frac{m(1-e^2)}{1+e\cos a_1}$$

Step 2. Find $P'_1$ $$P'_1 = 2m - P_1$$

Step 3. Solve for angle $b_1$ $$\cos b_1 = \frac{1}{e}\left(\frac{m(1-e^2)}{P'_1} - 1\right)$$

Step 4. Solve for angle between normal at $(x_1 y_1)$ and incident ray.

$$c = \frac{a_1 + b_1}{2} - 90$$

Step 5. Solve for path of refracted ray at $(x_1 y_1)$ referred to normal.

$$\sin d = \frac{1}{\mu}\sin c$$

Step 6. Slope of refracted ray at $(x_1 y_1)$ referred to axis.

$$i = d + g = d + \frac{a_1 - b_1}{2} + 90$$

Step 7. Solve for $x_1$ $$x_1 = P_1 \cos a_1$$

Step 8. Solve for $y_1$ $$y_1 = P_1 \sin a_1$$

Step 9. Equation of refracted ray.

$$y_1 = x_1 \tan i + C_1$$
$$C_1 = y_1 - x_1 \tan i$$

Step 10. Assume angle $a_2$ and solve for $P_2$ $$P_2 = \frac{m(1-e^2)}{1+e\cos a_2}$$

Step 11. Solve for $P'_2$ $$P'_2 = 2m - P_2$$

Step 12. Solve for $b_2$ $$\cos b_2 = \frac{1}{e}\left(\frac{m(1-e^2)}{P'_2} - 1\right)$$

Step 13. Solve for angle between normal at $(x_2 y_2)$ and reflected ray.

$$e = \frac{a_2 + b_2}{2} - 90$$

Step 14. Solve for angle between normal at $(x_2 y_2)$ and refracted ray.

$$f = \frac{a_2 + b_2}{2} - 90$$

Step 15. Slope of reflected ray at $(x_2 y_2)$ referred to axes.

$$j = k - h = \frac{a_1 - b_1}{2} - 90 - h$$

Step 16. Solve for $x_2$ $$x_2 = P_2 \cos a_2$$

Step 17. Solve for $y_2$ $$y_2 = P_2 \sin a_2$$

Step 18. Equation of path of reflected ray at $$y_2 = x_2 \tan s + C_2$$
$$C_2 = y_2 - x_2 \tan s$$

Step 19. Solve for intersection of rays at second surface.

$$x_3 = \frac{C_2 - C_1}{\tan i - \tan s}$$

Step 20. Optical length of refracted ray $L_1$ $$\mu L_1 = \mu(x_3 - x_1)\frac{1}{\cos s}$$

Step 21. Optical length of refracted reflected ray $L_2$ $$\mu L_2 = \mu(x_3 - x_2)\frac{1}{\cos s}$$

Step 22. Optical length of total path $$2m + 2\mu T_o = P_1 + \mu(L_1 + L_2) + P'_2$$

or $$dP = P_1 + \mu(L_1 + L_2) + P'_2 - (2m + 2\mu T_o)$$

If $dP$ is too large to be acceptable, assume some other value for $a_2$, step 10, and repeat through to step 22 until $dP$ is satisfactory.

*Empirical relation between ellipsoid and paraboloid.*

A very real objection may be raised against the exact method of computation just outlined on account of its great length. There are one hundred and thirty-four numbers or logarithms to be set down in the first trial for a point in the second surface, and seventy-nine numbers for each additional trial. For a solution correct to five figures, the total of numbers set down will be between three hundred and four hundred and fifty, depending upon how fortunate was the first choice of $(x_2 y_2)$. Usually the first choice is wide of the mark and the second and third choices lead to a close approximation on the fourth choice. The three values of $(x_2 y_3)$ for choices two, three and four should plot as a straight line, otherwise there is an error in the work, and additional points must be computed until three points do fall into line.

Several ways have been considered as means for avoiding this long computation, which is a serious obstacle when enough ($x_3y_3$) points to lay out a templet are to be obtained. The paraboloid and ellipsoid being members of the same family, it may reasonably be supposed that some of the computations might be derived from the previous work on the paraboloid. It is particularly desirable to know if we may use that part that has been greatly simplified by the use of the empirical equations.

In I. E. R. 1447, pages 22 to 35, a method of rapidly computing the thickness of a parabolic mirror is developed. This so-called "triangle method" is based upon the optical path of light through the edge of an extremely deep mirror, so deep in fact that the angle $a$ approaches 180 degrees and the front and back surface approach to straight lines in a meridian plane and approach also to parallelism.

A ray leaving the focus of the paraboloid at an angle of $a$ degrees with the axis is reflected at a point on the back of the mirror where the approximate thickness is $$T_t = \frac{T_0}{\sqrt{1-\left(\frac{\sin\frac{t}{2}}{\mu}\right)^2}} \quad (13)$$

$T_0$ being the central thickness of the mirror and $t$ being the angle between the incident and reflected rays at the point of first incidence. This equation being derived from the parabolic mirror can not be applied directly to the ellipsoid without first investigating at least one particular case.

An ellipsoid having an eccentricity of 0.625 and a central thickness $0.0305m(1-e)$ has been solved at four points by the exact method outlined previously.

Equation (13) may be written in a slightly simpler form, using the angle $c$ between the refracted ray at the point of incidence $$T_t = \frac{T_0}{\cos d} \quad (14)$$

*Comparison of ellipsoidal and paraboloidal second surface mirrors.*

| Angle of emission in ellipse. | Angle between incident and reflected ray.* | Thickness in terms of $T_0=1$. | | |
|---|---|---|---|---|
| | | Parabola exact.** | Ellipse exact.** | P or E triangle.*** |
| 30° | 22° 55′ 24.11″ | 1.008 | 1.008 | 1.008 |
| 60° | 44° 49′ 18.51″ | 1.033 | 1.032 | 1.033 |
| 90° | 64° 0′ 38.73″ | 1.066 | 1.065 | 1.066 |
| 128° | 77° 21′ 48.63″ | 1.096 | 1.095 | 1.096 |

*This angle is measured between the incident ray and the ray reflected from the first surface at ($x_1y_1$) and does not agree in the case of the ellipse with the main beam reflected by the second surface.

**The thickness as measured along the normal at the point of reflection ($x_3y_3$) at the second surface to its point of intersection ($X_5Y_5$) with the front surface.

***The thickness as measured from the apex of the triangle along a normal to the base. The base is tangent to ($x_1y_1$) and this normal does not exactly coincide with the normal to either first or second surface.

An inspection of the data in Table 1, shows all points on the ellipsoid to be within one point in a thousand of the thickness of the paraboloid at points where the angles between the incident and reflected rays at ($x_1y_1$) are equal. The triangle solution agrees with the exact solution of the paraboloid to within less than one part in five thousand and the difference is in such a direction as to make it approach the ellipsoid. There are thus three possibilities in solving the ellipsoid. First a direct solution which is exceedingly long, but of high accuracy. Second a solution depending on the exact solution of the paraboloid, which is over half the work and has an accuracy of one part in a thousand, and third, a solution by the triangle method which is about one-sixth the work and has an accuracy slightly better than the previous case.

There seems to be a general principle here that needs further confirmation, but for the reflector under consideration, we may state the important relation:

The relative thickness of glass is substantially identical in paraboloidal and ellipsoidal mirrors at points where the light is turned through equal angles.

The present purpose in designing an ellipsoid with a corrected second surface is to make a mirror that can be used with the high intensity arc. A high degree of accuracy is therefore not at all necessary, and for quantity production, an accuracy of one part in a thousand is probably well beyond present manufacturing limits. The triangle method therefore fulfills all requirements of design and specification.

*Arrangement of work for triangle solution for points on the second surface of ellipsoid.*

Step 1. Choose some angle of emission $a$, Fig. 2, and solve for $P_1$ (origin of coordinates at left focus).

$$P_1 = \frac{m(1-e^2)}{1+e\cos a_1}$$

Step 2. Find $P'_1$ $$P'_1 = 2m - P_1$$

Step 3. Solve for angle $b_1$ $$\cos b_1 = \frac{1}{e}\left(\frac{m(1-e)^2}{P'_1} - 1\right)$$

Step 4. Solve for $T_t$ $$T_t = \frac{T_o}{\sqrt{1-\left(\frac{\sin\frac{t}{2}}{\mu}\right)^2}}$$

where $t = a_1 + b_1 - 180$.

Step 5. Solve for $d$.

$$\sin d = \frac{1}{\mu}\sin\left(\frac{a_1-b_1-180}{2}\right)$$
$$= \frac{1}{\mu}\sin\frac{t}{2}$$

Step 6. Solve for $g$, Fig. 2

$$g = \frac{a_1-b_1}{2}+90$$

Step 7. Solve for slope of refracted ray at $(x_1 y_1)$.

$$i = g+d$$
$$i = \frac{a_1-b_1}{2}+90+d$$

Step 8. Solve for $x'_3$ (Fig. 4)

$$x'_3 = x_1 - T \sec c \cos i$$
$$= -(P_1 \cos a + T \sec c \cos i)$$

Step 9. Solve for $y'_3$ (Fig. 4)

$$y'_3 = y_1 + T \sec c \sin i$$
$$= P_1 \sin a + T \sec c \sin i$$

*Design data on mirror for 75 ampere H. E. arc.*

| | |
|---|---|
| Focus to vertex $m(1-e)$ | 11,000" |
| Distance between focii $2me$ | 40,000" |
| $me$ | 20,000" |
| $m$ | 31,000" |
| $e = \frac{20}{31}$ | 0.6451613 |
| $e^2$ | 0.4162327 |
| $1-e^2$ | 0.5837673 |
| Enlarging ratios along axis $=\frac{51}{11}$ | 4.636363 |
| Enlarging ratios at 30° ($P_1=13.30 P_2=48.70$) | 3.664 |

What I claim as new and desire to secure by Letters Patent of the United States is:

1. A glass reflector having a rear surface and having an ellipsoidal front surface, the former so located with reference to the front surface and of such configuration that the thickness $T_t$ of the glass measured along any line normal to the rear surface at the point of reflection of a ray originating at one of the focal points of the front surface is substantially $$\frac{T_o}{\cos d}$$

where $t$ is the angle through which the ray reflected at the first surface is turned, and $d$ is the angle between the normal to the front surface and the said ray after it is refracted at the point of entrance, and $T_o$ is the thickness of the glass on the axis.

2. A glass reflector having a rear surface and having an ellipsoidal front surface, the former so located with reference to the front surface and of such configuration that the thickness $T_t$ of the glass measured along a line normal to the front surface at the point of reflection of a ray originating at one of the focal points of the front surface is substantially $$\frac{T_o}{\cos d}$$

where said normal line makes any angle with the major axis, and where $t$ is the angle through which the ray reflected at the first surface is turned, and $d$ is the angle between the normal to the front surface and the said ray after it is refracted at the point of entrance, and $T_o$ is the thickness of the glass on the axis.

3. A concavo-convex glass reflector having an ellipsoidal front surface and a rear reflecting surface of revolution, the thickness $T_t$ of the glass between the two surfaces measured along any line perpendicular to the front surface at the point of reflection of a ray originating at one of the focal points of the front surface being substantially equal to $$\frac{T_o}{\cos d}$$

where $t$ is the angle through which the ray reflected at the first surface is turned, and $d$ is the angle between the normal to the front surface and the said ray after it is refracted at the point of entrance, and $T_o$ is the thickness of the glass on the axis, the front and rear surfaces having a common focal point.

In witness whereof I have hereunto set my hand this 23rd day of July, 1923.

FRANK A. BENFORD.

Certificate of Correction.

Patent No. 1,615,735. Granted January 25, 1927, to

FRANK A. BENFORD.

It is hereby certified that error appears in the printed specification of the above-mentioned patent requiring correction as follows: Page 2, line 5, strike out the equation and insert instead—

$$f = \frac{1+e}{1-e} (6);$$

same page, lines 116 and 121, for the word "completed" read *computed;* page 4, line 43, after the word "incidence" insert the words *and the normal;* and that the said Letters Patent should be read with this correction therein that the same may conform to the record of the case in the Patent Office.

Signed and sealed this 8th day of March, A. D. 1927.

[SEAL.]

M. J. MOORE,
*Acting Commissioner of Patents.*